United States Patent
Chen

(10) Patent No.: US 12,010,532 B2
(45) Date of Patent: Jun. 11, 2024

(54) MEASUREMENT GAP CONFIGURATION METHOD AND APPARATUS

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 93 days.

(21) Appl. No.: 17/979,697

(22) Filed: Nov. 2, 2022

(65) Prior Publication Data

US 2023/0077686 A1 Mar. 16, 2023

Related U.S. Application Data

(63) Continuation of application No. 16/763,198, filed as application No. PCT/CN2018/112933 on Oct. 31, 2018, now Pat. No. 11,528,619.

(30) Foreign Application Priority Data

Nov. 10, 2017 (CN) .......................... 201711107857.3

(51) Int. Cl.
*H04W 24/02* (2009.01)

(52) U.S. Cl.
CPC .................... *H04W 24/02* (2013.01)

(58) Field of Classification Search
CPC . H04W 24/02; H04W 36/0088; H04W 76/28; H04W 28/18; H04L 5/001
See application file for complete search history.

(56) References Cited

U.S. PATENT DOCUMENTS

| | | | |
|---|---|---|---|
| 2012/0252487 A1 | 10/2012 | Siomina et al. | |
| 2013/0114508 A1 | 5/2013 | Liang | |
| 2015/0327104 A1* | 11/2015 | Yiu ................... | H04W 36/0088 455/450 |
| 2017/0086110 A1 | 3/2017 | Wu et al. | |
| 2019/0075585 A1* | 3/2019 | Deogun ................ | H04W 72/23 |

FOREIGN PATENT DOCUMENTS

| | | |
|---|---|---|
| CN | 101873646 A | 10/2010 |
| CN | 103888987 A | 6/2014 |
| CN | 106211230 A | 12/2016 |
| WO | 2016/164782 A1 | 10/2016 |
| WO | 2016/182527 A1 | 11/2016 |

OTHER PUBLICATIONS

Intel Corporation., "Overall impact in RAN2 for BWP," 3GPP TSG RAN WG2 Meeting #99bis, R2-1710592, pp. 1-8, (Oct. 9-13, 2017).

(Continued)

*Primary Examiner* — Kyaw Z Soe
(74) *Attorney, Agent, or Firm* — Brooks Kushman P.C.

(57) ABSTRACT

A measurement gap configuration method and a measurement gap configuration apparatus are provided. The configuration method includes: determining a first configuration that is configured for a user equipment by a second network node; and configuring a measurement gap for the user equipment according to the first configuration.

20 Claims, 8 Drawing Sheets

(56) References Cited

OTHER PUBLICATIONS

RAN4., "Draft : LS on gaps for SS block measurement in NR," 3GPP RAN WG4 Meeting 84bis, (R4-1711940-R4-17111940), pp. 1-3, (Oct. 9-13, 2017).
International Search Report and Written Opinion of the International Searching Authority dated Jan. 24, 2019 as received In Application No. PCT/CN2018/112933.
CN Office Action dated Apr. 2, 2020 as received in Application No. 201711107857.3.
Extended European Search Report dated Nov. 3, 2020 as received in Application No. 18875819.7.
U.S. Non-Final Office Action dated Mar. 17, 2022 as received in U.S. Appl. No. 16/763,198.

\* cited by examiner

MEASUREMENT GAP CONFIGURATION METHOD AND APPARATUS

CROSS-REFERENCE TO RELATED APPLICATION

This application is a continuation application of U.S. application Ser. No. 16/763,198 filed on May 11, 2020, which is a U.S. national phase of PCT Application No. PCT/CN2018/112933 filed on Oct. 31, 2018, which claims the priority of Chinese Patent Application No. 201711107857.3 filed on Nov. 10, 2017, the contents of which are incorporated herein in their entirety by reference.

TECHNICAL FIELD

The present disclosure relates to the field of communication technology, and in particular to a measurement gap configuration method and a measurement gap configuration apparatus.

BACKGROUND

Long Term Evolution (LTE) introduces measurement gaps in inter-frequency/Inter-RAT measurement. A measurement gap refers to the interruption time caused by retuning from one radio frequency (RF) to another RF to perform the measurement of the corresponding reference signal during the measurement.

The pattern of measurement gaps in LTE is fixed. The network side configures the start position of the measurement gap (including the system frame number (SFN) for the system frame in which the measurement gap located, and the subframe information) by the measurement gap configuration parameter, measGapConfig.

In LTE of the related art, the base station configures the measurement gap of a user equipment (UE) according to the reported capability of the UE. The time length of the measurement gap configured in this way is a fixed value (for example, 6 ms), and the period for the measurement gap is also limited. Thus, it is not suitable for flexible configuration of measurement gap in the $5^{th}$ Generation (5G) Mobile Communication New Radio (NR) system.

SUMMARY

In a first aspect, an embodiment of the present disclosure provides a measurement gap configuration method applied to a first network node, including:
  determining a first configuration that is configured for a user equipment by a second network node; and
  configuring a measurement gap for the user equipment according to the first configuration.

In a second aspect, an embodiment of the present disclosure further provides a measurement gap configuration method applied to a user equipment, including:
  receiving a measurement gap sent by a first network node, the measurement gap being configured for the user equipment by the first network node according to a first configuration, the first configuration being configured for the user equipment by a second network node.

In a third aspect, an embodiment of the present disclosure further provides a first network node, including:
  a determination module configured to determine a first configuration that is configured for a user equipment by a second network node; and
  a configuration module configured to configure a measurement gap for the user equipment according to the first configuration.

In a fourth aspect, an embodiment of the present disclosure further provides a user equipment, including:
  a second reception module configured to receive a measurement gap sent by a first network node, the measurement gap being configured for the user equipment by the first network node according to a first configuration, the first configuration being configured for the user equipment by a second network node.

In a fifth aspect, an embodiment of the present disclosure further provides a first network node including a processor, a storage, and a program stored on the storage and capable of running on the processor, when executed by the processor, the program implementing the steps of the measurement gap configuration method according to the first aspect.

In a sixth aspect, an embodiment of the present disclosure further provides a user equipment including a processor, a storage, and a program stored on the storage and capable of running on the processor, when executed by the processor, the program implementing the steps of the measurement gap configuration method according to the second aspect.

In a seventh aspect, an embodiment of the present disclosure further provides a computer readable storage medium having a program stored thereon, when executed by a processor, the program implementing the steps of the measurement gap configuration method according to the first aspect or the second aspect.

BRIEF DESCRIPTION OF THE DRAWINGS

Various other advantages and benefits will become apparent to those of ordinary skill in the art upon reading the detailed description of the alternative implementations below. The drawings are only for the purpose of illustrating the alternative implementations and are not to be considered as limiting the present disclosure. Moreover, the same reference numerals are used to refer to the same parts throughout the drawings, in which.

DETAILED DESCRIPTION

Figure 1:
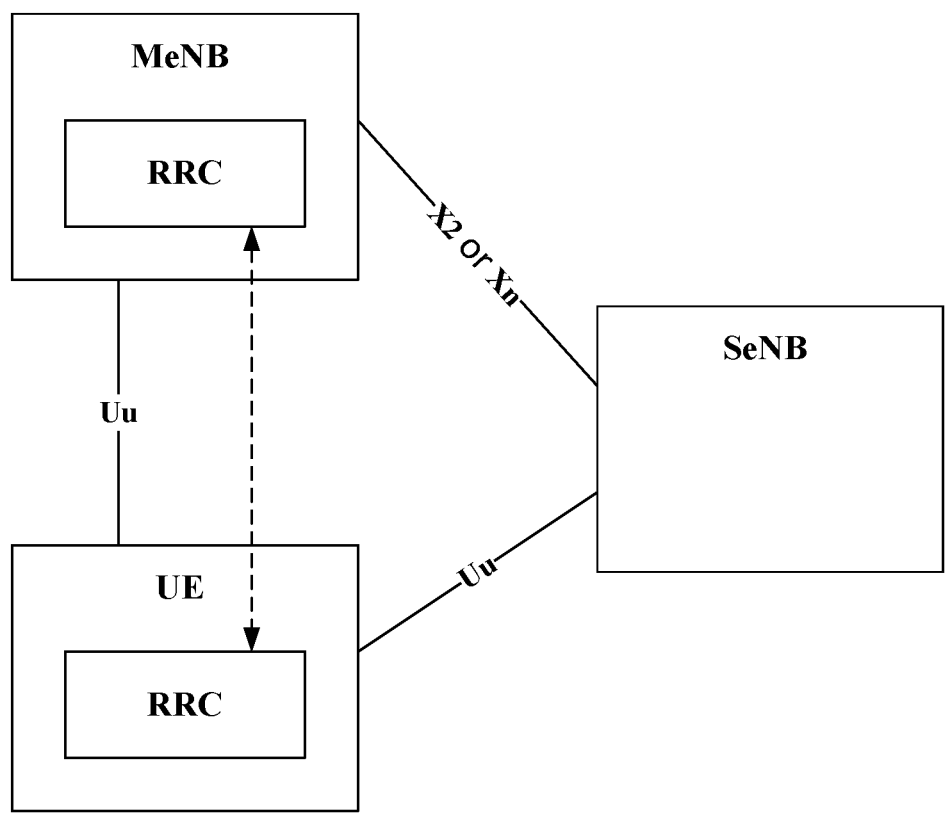
FIG. 1 is a structural diagram of a dual connection.

The technical solutions in the embodiments of the present disclosure will be described clearly and thoroughly herein-after in conjunction with the drawings. It should be understood that the embodiment described herein is merely an illustration of the present disclosure rather than a limitation thereof. Obviously, the described embodiments are some embodiments of the present disclosure, but not all of the embodiments. Based on the embodiments in the present disclosure, all other embodiments obtained by a person of ordinary skill in the art without creative efforts shall fall within the protection scope of the present disclosure.

The terms "first", "second", and the like in the specification and claims of the present disclosure are used to distinguish similar objects, and are not necessarily used to describe a specific order or sequence. It should be understood that the terms used herein may be interchanged where appropriate, so that embodiments of the present disclosure described herein are implemented, for example, in an order other than those illustrated or described herein. Furthermore, the terms "comprising" and "having" and any of their variations are intended to cover non-exclusive inclusions, for example, a process, method, system, product, or device that includes a series of steps or units need not be limited to those explicitly listed steps or units; instead, they may include other steps or units not explicitly listed or inherent to the process, method, product or device. In addition, the use of "and/or" in the specification and in the claims indicates at least one of the connected objects, such as A and/or B, which means that there are three cases of A alone, B alone, and both A and B.

In the embodiments of the present disclosure, words such as "exemplary" or "for example" are used to show examples, illustrations or explanations. Any embodiment or design described as "exemplary" or "for example" in the embodiments of the present disclosure should not be construed as more preferred or advantageous over other embodiments or designs. Rather, the use of the words "exemplary" or "for example" is intended to present the relevant concept in a specific manner.

Next, several techniques are introduced first:

(1) Introduction to the measurement gap (MG):

In communication protocols, the measurement includes intra-frequency measurement and inter-frequency measurement. The intra-frequency measurement refers to a measurement to be performed when the cell in which the UE is currently located and the target cell to be measured are on a same carrier frequency (for example, the center frequency). The inter-frequency measurement refers to a measurement to be performed when the cell in which the UE is currently located and the target cell are not on a same carrier frequency.

If the UE needs to perform the inter-frequency measurement (including inter-radio access technology (inter-RAT, or referred to as inter-system) measurement), a simple way is to install two types of radio frequency receiver in the UE to measure the frequency of the local cell and the frequency of the target cell, respectively, but this will cause the problem of increased cost and interference between different frequencies. Therefore, the 3rd Generation Partnership Project (3GPP) proposed a manner of measurement gap, that is, during normal data transmission and reception, a part of the time (i.e., the time of the measurement gap) is reserved. During this time, the UE will not send or receive any data, but tune the RF receiver to the frequency of the target cell to perform the inter-frequency (or inter-RAT) measurement. When the time of the measurement gap is over, the UE returns to the current cell to continue data transmission and reception.

The carrier frequencies of the current cell and the target cell are different, and the bandwidth of the target cell is smaller than and is within that of the current cell: this scenario requires the inter-frequency measurement and thus requires measurement gaps.

The carrier frequencies of the current cell and the target cell are different, and the bandwidth of the target cell is greater than and is within that of the current cell: this scenario requires the inter-frequency measurement and thus requires measurement gaps.

The carrier frequencies of the current cell and the target cell are different, and the bandwidths of the target cell and the current cell do not overlap: this scenario requires the inter-frequency measurement and thus requires measurement gaps.

In order for the UE to determine when to perform inter-frequency measurement or data transmission and reception, the UE and the network must have consistent understanding of the configuration of measurement gap (for example, the configuration of measurement gap includes the start position of gap, the gap length, the gap number, etc.). The configuration of measurement gap may be defined by the configuration of measurement gap MeasGapConfig, which is information element (IE) of Radio Resource Control (re-)configuration (RRC (re-)configuration) message.

The measurement gap as mentioned above is configured per UE, that is, each UE has its own measurement gap. In the LTE-Advanced, per-Component Carrier (per-CC) measurement gap is proposed, that is, one measurement gap is configured for each component carrier. Under the dual connectivity (DC) architecture, for the individual cells in the master cell group (MCG) and secondary cell group (SCG) under the master eNB (MeNB) and secondary eNB (SeNB), their component carriers are different with each other, thus, the per-CC measurement gap means that each cell is configured with measurement gap individually.

In the fifth-generation (5G) NR, per-cell group (per-CG) measurement gap is configured per CG. That is, the MCG and the SCG can configure a measurement gap for the same UE, respectively, that is, all cells (or component carriers) under the MCG (or the SCG) use this measurement gap.

From the perspective of granularity, the per-UE measurement gap, the per-CG measurement gap, and the per-CC measurement gap correspond to coarse to fine granularity, respectively.

(2) Introduction to the configuration of measurement gap:

The LTE introduces the measurement gaps in inter-frequency/Inter-RAT measurement. The measurement gap refers to the interruption time caused by retuning from one radio frequency (RF) to another RF to perform the measurement of the corresponding reference signal during the measurement.

The pattern of measurement gaps in LTE is fixed. The network side may configure the start position of the measurement gap (e.g., the system frame number (SFN) for the system frame in which the measurement gap located, or the subframe information) by the parameter measGapConfig. The details are as follows:

TABLE 1

Gap pattern

| Gap Pattern Id | Measurement Gap Length (MGL), ms | Measurement Gap Repetition Period (MGRP), ms | Minimum available time for inter-frequency and inter-RAT measurements during 480 ms period |
|---|---|---|---|
| 0 | 6 | 40 | 60 |
| 1 | 6 | 80 | 30 |

```
Gap configuration
MeasGapConfig ::=            CHOICE {
    release                  NULL,
    setup                    SEQUENCE {
        gapOffset            CHOICE {
            gp0              INTEGER (0..39),
            gp1              INTEGER (0..79),
            ...,
            gp2-r14          INTEGER (0..39),
            gp3-r14          INTEGER (0..79),
            gp-ncsg1-r14     INTEGER (0..39),
            gp-ncsg2-r14     INTEGER (0..79),
            gp-ncsg3-r14     INTEGER (0..39),
            gp-ncsg4-r14     INTEGER (0..79),
            gp-nonUniform1-r14   INTEGER (0..1279),
            gp-nonUniform2-r14   INTEGER (0..2559),
            gp-nonUniform3-r14   INTEGER (0..5119),
            gp-nonUniform4-r14   INTEGER (0..10239)
        }
    }
}
```

After receiving the gap offset information, the UE calculates the start position of the gap according to the following formulas:

SFN mod $T$=FLOOR(gapOffset/10);

subframe=gapOffset mod 10;

with $T=MGRP/10$ as defined in $TS$ 36.133 [16];

From the above, it can be seen that the time length of the gap is fixed at 6 ms, and there are only two options for the period, which is not suitable for flexible configuration of measurement gap in the NR system.

(3) Introduction to the EN-DC for LTE and NR (LTE-NR Dual Connection):

In the discussion of a non-standalone scenario for the interworking of the 5G NR and the LTE, in the first stage, the LTE base station is used as the master eNB (MeNB), and the NR base station (gNB) is used as the secondary eNB (SeNB). However, in the future, a scenario in which the NR base station is used as the MeNB and the LTE base station is used as the SeNB will be also discussed. Referring to FIG. 1, it should be noted that the NR-NR DC is similar and will not be described here.

(4) Introduction to Carrier Aggregation (CA):

CA technology can aggregate multiple component carriers (CC) together to achieve a large transmission bandwidth, which effectively improves the uplink and downlink transmission rates. The terminal determines how many carriers it can use for uplink and downlink transmission at the same time according to its own capability. The CA function can support continuous or discontinuous carrier aggregation. The CA technology can be used in LTE or NR or other systems.

(5) Introduction to the large bandwidth part:

The 5G NR system supports a maximum system bandwidth of 400 MHz, which is much larger than the maximum system bandwidth of 20 MHz of the LTE, to support larger system and user throughput. However, supporting such a large system bandwidth will be a huge challenge for the implementation of the UE, which is not conducive to the implementation of low-cost UEs. Therefore, the 5G NR system also supports dynamic and flexible bandwidth allocation. The system bandwidth is divided into multiple bandwidth parts (BWPs) to support the access to a narrowband user equipment or a user equipment in energy saving mode.

The 5G NR system supports operating frequency bands above 6 GHz, which can provide greater throughput for data transmission. The high-frequency signal has a short wavelength; compared with a system supporting the low-frequency band, more antenna elements can be arranged on the same size panel, and multiple beams with stronger directivity and narrower lobes can be formed by using beamforming technology. The 5G NR system uses beam scanning technology to send broadcast signals or system information to user equipment in the cell.

In order to make the objectives, technical solutions, and advantages of the present disclosure more clear, the technical solutions in the embodiments of the present disclosure will be described clearly and completely in combination with the drawings in the embodiments of the present disclosure. Obviously, the described embodiments are some of the embodiments of the present disclosure, not all embodiments. Based on the embodiments in the present disclosure, all other embodiments obtained by a person of ordinary skill in the art without making creative efforts shall fall within the protection scope of the present disclosure.

In view of the fact that the measurement gap configured by the related technology cannot meet the flexible reference signal configuration, the embodiments of the present disclosure provide a measurement gap configuration method and a measurement gap configuration apparatus.

Figure 2:
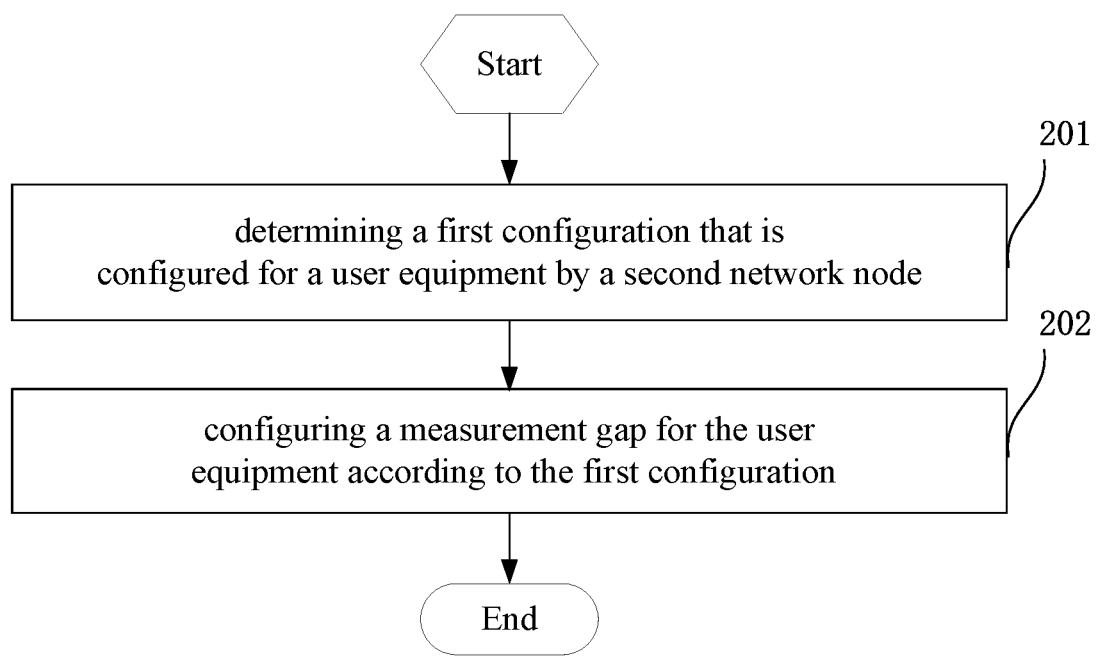
FIG. 2 is a first flowchart of a measurement gap configuration method according to an embodiment of the present disclosure.

Referring to FIG. 2, it shows a flowchart of a measurement gap configuration method. The method is performed by a first network node, and includes steps 201 to 202.

Step 201, determining a first configuration that is configured for a user equipment by a second network node.

In the embodiment of the present disclosure, optionally, the first configuration may be configured for the UE by the second network node according to a capability indication reported by the UE. The capability indication includes one or more of: a frequency, a bandwidth, a BWP position and a BWP bandwidth supported by the UE; obviously, it is not limited thereto.

In the embodiment of the present disclosure, the first and second network nodes may be network nodes in the dual connectivity architecture. The dual connectivity architecture can be applied to 5G systems or other systems with similar requirement for the configuration of measurement gap. Obviously, it can be understood that the measurement gap configuration method of the embodiment of the present disclosure can also be applied to the Carrier Aggregation (CA) architecture or other architecture similar to DC or CA.

For example, the first network node is a master base station in the NR-LTE architecture or the NR-LTE DC architecture or the NR-NR DC architecture, and the second network node is a secondary base station in the NR-LTE architecture or the NR-LTE DC architecture or the NR-NR DC architecture; or, the first network node is a secondary base station in the NR-LTE architecture or the NR-LTE DC architecture or the NR-NR DC architecture, and the second network node is a master base station in the NR-LTE architecture or the NR-LTE DC architecture or the NR-NR DC architecture.

In the embodiment of the present disclosure, the first network node may be a master node (MN), and the second network node is a secondary node (SN); or, the first network may be the SN, and the second network node is the MN.

In the 5G NR architecture or the EN-DC architecture, the SN may have more capabilities, including the capability to configure the measurement gap. After the SN configures the measurement gap, it can coordinate with the MN to configure the measurement gap of the UE to achieve a dynamic configuration of the measurement gap by the MN, so that the measurement gap configured dynamically by the MN can adapt to the flexible configuration of measurement gap in the 5G NR system or the EN-DC system.

In the embodiment of the present disclosure, the first configuration may include one or more of: a measurement configuration, a configured bandwidth part (BWP), an activated BWP, a synchronization signal block (SSB) pattern, a deployed frequency, a deployed bandwidth, an operating frequency, and an operating bandwidth; obviously, it is not limited thereto. The measurement configuration refers to the configuration of measurement gap. Optionally, the measurement gap may include: a measurement object and/or a measurement parameter; obviously, it is not limited thereto.

It should be noted that the above user equipment may be a mobile phone, a tablet, a notebook, an Ultra-Mobile Personal Computer (UMPC), a netbook, or a Personal Digital Assistant (PDA), or the like.

Step 202, configuring a measurement gap for the user equipment according to the first configuration.

For example, a measurement gap is configured directly for the user equipment according to the first configuration, or a measurement gap is configured for the user equipment according to the first configuration and a capability indication reported by the user equipment. Optionally, the capability indication may include: a frequency, a bandwidth, a BWP position and a BWP bandwidth supported by the UE.

In the embodiment of the present disclosure, optionally, the measurement gap may include one or more of: per-UE measurement gap; per-CC measurement gap; per-CG measurement gap; per-BWP measurement gap; per-band measurement gap; per-band combination measurement gap; per-channel measurement gap; per-channel combination measurement gap; per-measurement object measurement gap; and per-frequency measurement gap; obviously, it is not limited thereto.

For example, in some cases, the scenarios in which the user equipment (i.e., the terminal) does not need to the measurement gap include, but are not limited to, the following:

C1, the synchronization signal block is at the frequency center, the frequency domain position of the synchronization signal block of the local cell is consistent with that of the neighbor cell, and the operating frequency bandwidth covers all reference signals to be measured;

C2, the synchronization signal block is offset from the frequency center, the frequency domain position of the synchronization signal block of the local cell is consistent with that of the neighbor cell, and the operating frequency bandwidth covers multiple or all reference signals to be measured;

C3, multiple synchronization signal blocks are within the operating bandwidth, and multiple measurement objects are configured accordingly, the SSB of the local cell is consistent with that of the neighbor cell, and the operating frequency bandwidth covers all reference signals to be measured;

C4, the cell center frequencies of multiple carriers are inconsistent, and the center frequency of the reference signal is offset from that of the configured measurement object, but ultimately all the reference signals to be measured are located at the same position;

It should be noted that, in the scenario of C4, the following relationships may exist between the carriers: the carriers partially overlap with each other, or there is an inclusion relationship between the carriers.

Similarly, the scenarios in which the terminal needs the measurement gap can also be exemplified as follows, but those skilled in the art can understand that the following scenarios are only examples, not limitations:

D1, the operating frequency band of the terminal does not include the reference signal position to be measured;

D2, the terminal needs to measure other synchronization signal block reference signals on the carrier where it is located, which exceeds its operating frequency band;

D3, in the operating frequency band of the terminal, in addition to the SSB of the serving cell, the synchronization signal block of a neighbor cell still needs to be measured, but the subcarrier space (SCS) of the synchronization signal block of the neighbor cell is different from that of the serving cell.

D4, the data of the local cell and the SSB of the neighbor cell overlap in time and frequency, but the data and the synchronization signal block are not consistent in the SCS; when the synchronization signal block at this frequency needs to be measured, the measurement gap is also required;

D5, in the case of being on the same frequency but belonging to different beams, the measurement gap may be required according to the capability of the terminal.

In this way, in the embodiment of the present disclosure, the first network node can coordinately configure the measurement gap for the user equipment according to the first configuration configured for the user equipment by the second network node, and thus the first network node can dynamically configure the measurement gap so that the measurement gap configured by the first network node dynamically can meet the requirement for a flexible configuration of measurement gap.

Figure 3:
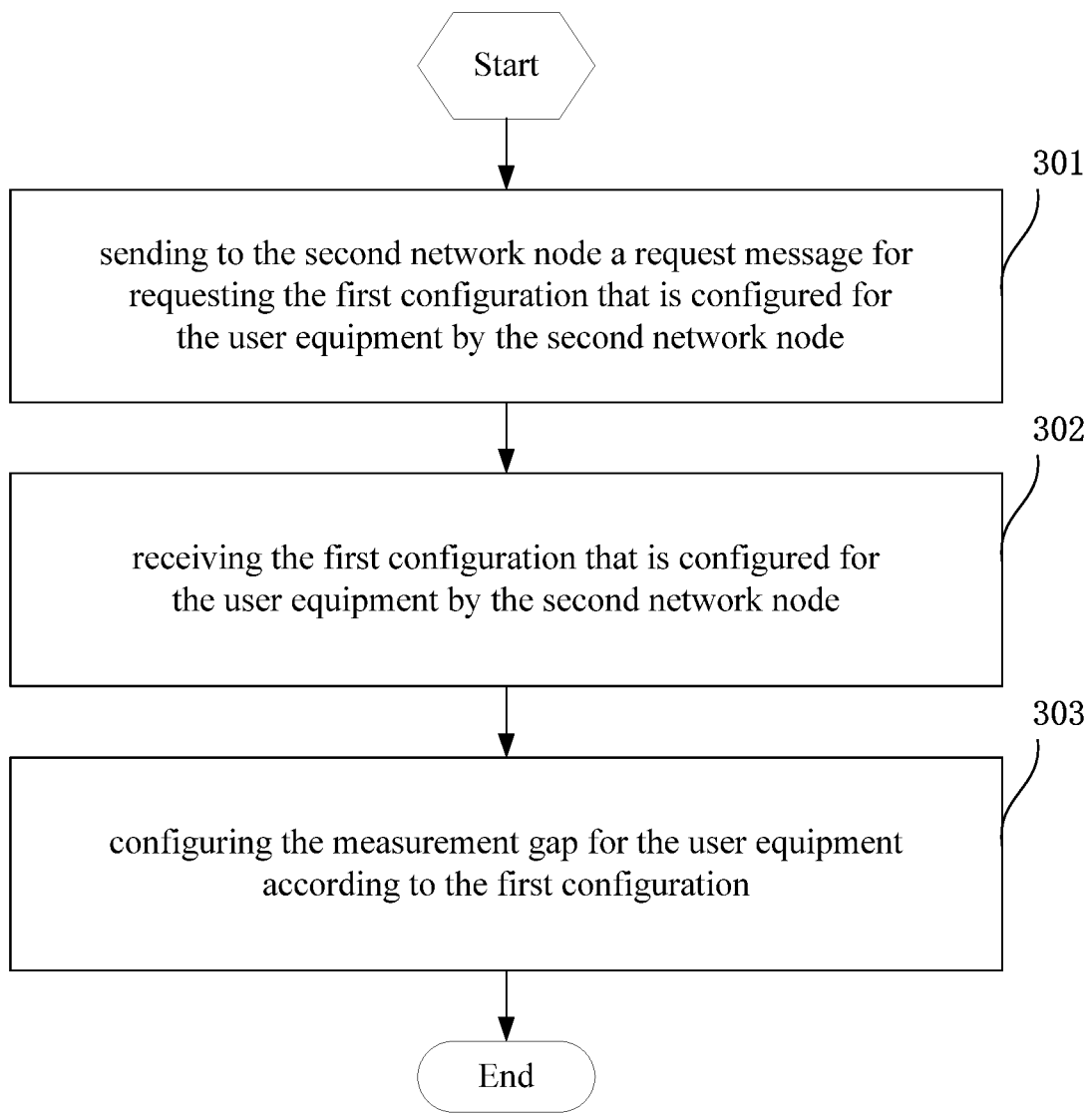
FIG. 3 is a second flowchart of a measurement gap configuration method according to an embodiment of the present disclosure.

Referring to FIG. 3, it shows a flowchart of a measurement gap configuration method, which is applied to a first network node, including steps 301 to 303.

Step 301, sending a request message to the second network node for requesting the first configuration that is configured for the user equipment by the second network node.

In the embodiment of the present disclosure, optionally, the first configuration may be configured for the UE by the second network node according to a capability indication reported by the UE. The capability indication includes one or more of: a frequency, a bandwidth, a BWP position and a BWP bandwidth supported by the UE; obviously, it is not limited thereto.

In the embodiment of the present disclosure, the first and second network nodes may be network nodes in the dual connectivity architecture. The dual connectivity architecture can be applied to 5G systems or other systems with similar requirement for the configuration of measurement gap. Obviously, it can be understood that the measurement gap configuration method of the embodiment of the present disclosure can also be applied to the Carrier Aggregation (CA) architecture or other architecture similar to DC or CA.

In the embodiment of the present disclosure, the first network node may be a master node (MN), and the second network node is a secondary node (SN); or, the first network may be the SN, and the second network node is the MN. For example, the first network node is a master base station in the NR-LTE architecture or the NR-LTE DC architecture or the NR-NR DC architecture, and the second network node is a secondary base station in the NR-LTE architecture or the NR-LTE DC architecture or the NR-NR DC architecture; or, the first network node is a secondary base station in the NR-LTE architecture or the NR-LTE DC architecture or the NR-NR DC architecture, and the second network node is a master base station in the NR-LTE architecture or the NR-LTE DC architecture or the NR-NR DC architecture.

In the 5G NR architecture or the EN-DC architecture, the SN may have more capabilities, including the capability to configure the measurement gap. After the SN configures the measurement gap, it can coordinate with the MN to configure the measurement gap of the UE to achieve a dynamic configuration of the measurement gap by the MN, so that the measurement gap configured dynamically by the MN can adapt to the flexible configuration of measurement gap in the 5G NR system or the EN-DC system.

In the embodiment of the present disclosure, the first configuration may include one or more of: a measurement configuration, a configured bandwidth part (BWP), an activated BWP, a synchronization signal block (SSB) pattern, a deployed frequency, a deployed bandwidth, an operating frequency, and an operating bandwidth; obviously, it is not limited thereto. The measurement configuration refers to the configuration of measurement gap. Optionally, the measurement gap may include: a measurement object and/or a measurement parameter; obviously, it is not limited thereto.

It should be noted that the above user equipment may be a mobile phone, a tablet, a notebook, an Ultra-Mobile Personal Computer (UMPC), a netbook, or a Personal Digital Assistant (PDA), or the like.

It should be noted that, step 301 is an optional step.

Step 302, receiving the first configuration that is configured for the user equipment by the second network node.

In the embodiment of the present disclosure, there are several methods for receiving the first configuration that is configured for the user equipment by the second network node.

Method 1: receiving the first configuration that is configured for the user equipment by the second network node from the second network node.

For example, receiving, from an interface (e.g., an X2 interface or an Xn interface) between base stations of the second network node or an operation management and maintenance (OAM), the first configuration that is configured for the user equipment by the second network node.

Method 2: receiving, from the second network node, the first configuration that is configured for the user equipment by the second network node, wherein the first configuration is reported to the second network node by the user equipment, that is to say, the user equipment reports the first configuration to the second network node, and the second network node sends the first configuration to the first network node.

For example, receiving, from an interface (e.g., an X2 interface or an Xn interface) between base stations of the second network node or an operation management and maintenance (OAM), the first configuration that is configured for the user equipment by the second network node.

It should be noted that, in the above Method 1 and Method 2, optionally, when the second network node has the first configuration that is configured for the user equipment by the second network node, the first configuration that is configured for the user equipment by the second network node is received from the second network node; or, when the first configuration that is configured for the user equipment by the second network node is changed, the first configuration that is configured for the user equipment by the second network node is received from the second network node; in other words, when there is the first configuration or the first configuration is changed, the second network node sends the first configuration of the user equipment to the first network node.

Method 3: receiving the first configuration reported by the user equipment that is configured for the user equipment by the second network node.

Method 4: receiving the first configuration reported by the user equipment that is configured for the user equipment by the second network node, wherein the first configuration is sent to the user equipment by the first network node or the second network node.

Step 303, configuring the measurement gap for the user equipment according to the first configuration.

In the embodiment of the present disclosure, optionally, the measurement gap may include one or more of: per-UE measurement gap; per-CC measurement gap; per-CG measurement gap; per-BWP measurement gap; per-band measurement gap; per-band combination measurement gap; per-channel measurement gap; per-channel combination measurement gap; per-measurement object measurement gap; and per-frequency measurement gap; obviously, it is not limited thereto.

In the embodiment of the present disclosure, optionally, the measurement gap may include one or more of:
   measurement gap information corresponding to all or part of configured BWPs;
   measurement gap information corresponding to all or part of activated BWPs;
   measurement gap information corresponding to a deployed bandwidth;
   measurement gap information corresponding to a current operating bandwidth of the user equipment; and
   measurement gap information corresponding to a measurement configuration of the user equipment.

In the embodiment of the present disclosure, optionally, the measurement gap may include one or more of: a time start position, a duration, a period, an aperiodic indication, an one-off indication, and an offset.

In this way, the first network node can coordinately configure the measurement gap for the user equipment according to the first configuration configured for the user equipment by the second network node, and thus the first network node can dynamically configure the measurement gap so that the measurement gap configured by the first network node dynamically can meet the requirement for a flexible configuration of measurement gap.

Figure 4:
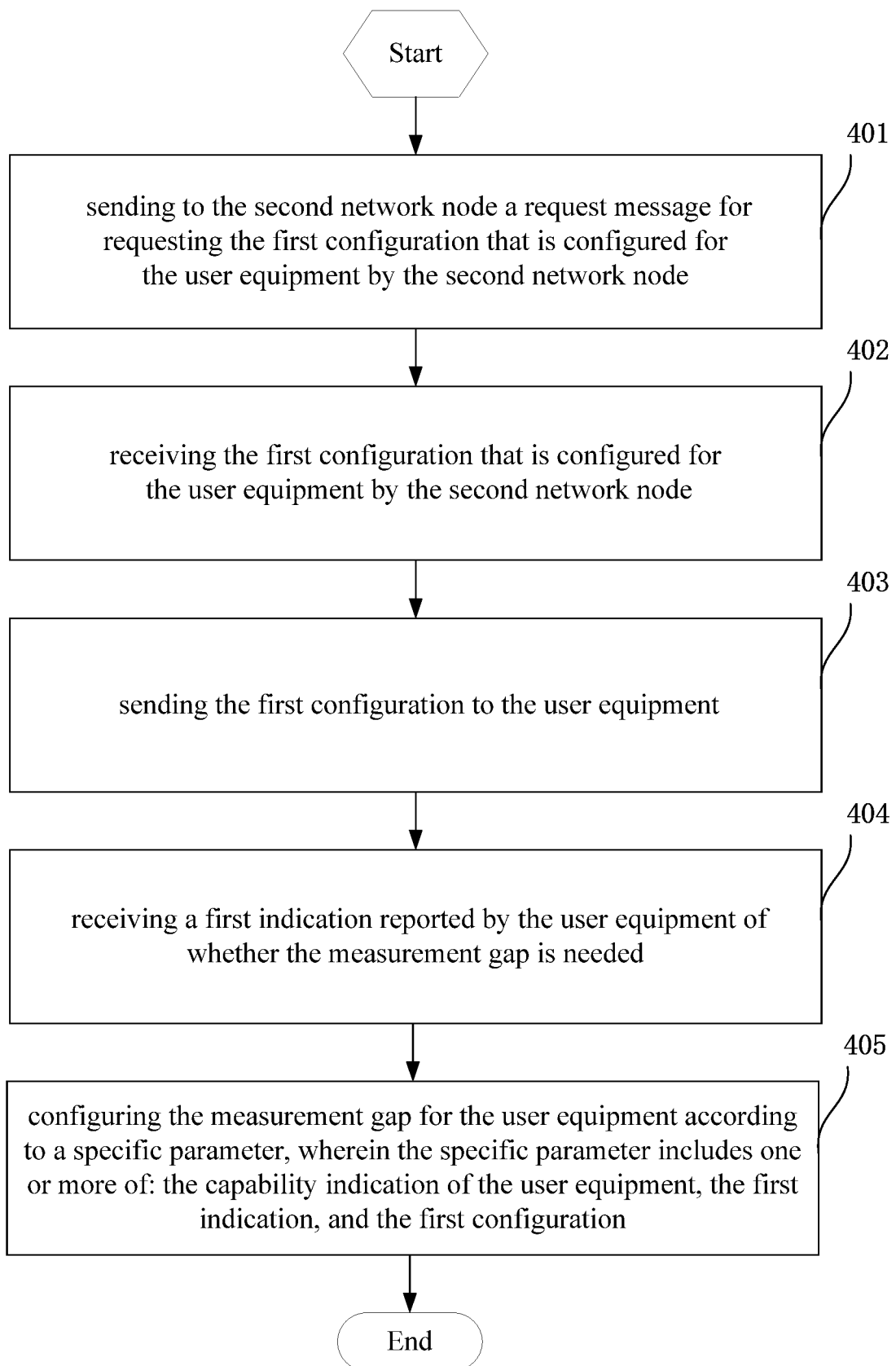
FIG. 4 is a third flowchart of a measurement gap configuration method according to an embodiment of the present disclosure.

Referring to FIG. 4, it shows a flowchart of a measurement gap configuration method, which is applied to a first network node, including steps 401 to 405.

Step 401, sending a request message to the second network node for requesting the first configuration that is configured for the user equipment by the second network node.

In the embodiment of the present disclosure, optionally, the first configuration may be configured for the UE by the second network node according to a capability indication reported by the UE. The capability indication includes one or more of: a frequency, a bandwidth, a BWP position and a BWP bandwidth supported by the UE; obviously, it is not limited thereto.

In the embodiment of the present disclosure, the first network node may be the master node (MN), and the second network node is the secondary node (SN); or, the first network node may be the SN, and the second network node is the MN.

In the embodiment of the present disclosure, the first and second network nodes may be network nodes in the dual connectivity architecture. The dual connectivity architecture can be applied to 5G systems or other systems with similar requirement for the configuration of measurement gap. Obviously, it can be understood that the measurement gap configuration method of the embodiment of the present disclosure can also be applied to the Carrier Aggregation (CA) architecture or other architecture similar to DC or CA.

For example, the first network node is a master base station in the NR-LTE architecture or the NR-LTE DC architecture or the NR-NR DC architecture, and the second network node is a secondary base station in the NR-LTE architecture or the NR-LTE DC architecture or the NR-NR DC architecture; or, the first network node is a secondary base station in the NR-LTE architecture or the NR-LTE DC architecture or the NR-NR DC architecture, and the second network node is a master base station in the NR-LTE architecture or the NR-LTE DC architecture or the NR-NR DC architecture.

In the 5G NR architecture or the EN-DC architecture, the SN may have more capabilities, including the capability to configure the measurement gap. After the SN configures the measurement gap, it can coordinate with the MN to configure the measurement gap of the UE to achieve a dynamic configuration of the measurement gap by the MN, so that the measurement gap configured dynamically by the MN can adapt to the flexible configuration of measurement gap in the 5G NR system or the EN-DC system.

In the embodiment of the present disclosure, the first configuration may include one or more of: a measurement configuration, a configured bandwidth part (BWP), an activated BWP, a synchronization signal block (SSB) pattern, a deployed frequency, a deployed bandwidth, an operating frequency, and an operating bandwidth; obviously, it is not limited thereto. The measurement configuration may include: a measurement object and/or a measurement parameter; obviously, it is not limited thereto.

It should be noted that the above user equipment may be a mobile phone, a tablet, a notebook, an Ultra-Mobile Personal Computer (UMPC), a netbook, or a Personal Digital Assistant (PDA), or the like.

It should be noted that, step 401 is an optional step.

Step 402, receiving the first configuration that is configured for the user equipment by the second network node.

In the embodiment of the present disclosure, there are several methods for receiving the first configuration that is configured for the user equipment by the second network node.

Method 1: receiving the first configuration that is configured for the user equipment by the second network node from the second network node.

For example, receiving, from an interface (e.g., an X2 interface or an Xn interface) between base stations of the second network node or an operation management and maintenance (OAM), the first configuration that is configured for the user equipment by the second network node.

Method 2: receiving, from the second network node, the first configuration that is configured for the user equipment by the second network node, wherein the first configuration is reported to the second network node by the user equipment, that is to say, the user equipment reports the first configuration to the second network node, and the second network node sends the first configuration to the first network node.

For example, receiving, from an interface (e.g., an X2 interface or an Xn interface) between base stations of the second network node or an operation management and maintenance (OAM), the first configuration that is configured for the user equipment by the second network node.

It should be noted that, in the above Method 1 and Method 2, optionally, when the second network node has the first configuration that is configured for the user equipment by the second network node, the first configuration that is configured for the user equipment by the second network node is received from the second network node; or, when the first configuration that is configured for the user equipment by the second network node is changed, the first configuration that is configured for the user equipment by the second network node is received from the second network node; in other words, when there is the first configuration or the first configuration is changed, the second network node sends the first configuration of the user equipment to the first network node.

Method 3: receiving the first configuration reported by the user equipment that is configured for the user equipment by the second network node.

Method 4: receiving the first configuration reported by the user equipment that is configured for the user equipment by the second network node, wherein the first configuration is sent to the user equipment by the first network node or the second network node.

Step 403, sending the first configuration to the user equipment.

In the embodiment of the present disclosure, the first configuration may be sent to the user equipment by the following methods:

Method 1: sending the first configuration to the user equipment directly.

In this Method 1, optionally, when it is determined that the first configuration exists, the first configuration is sent to the user equipment directly; or, when the first configuration is changed, the (changed) first configuration is sent to the user equipment directly.

Method 2: sending the first configuration to the second network node, and then sending the first configuration to the user equipment by the second network node; that is to say, the first configuration is sent to the user equipment via the second network node; for example, the first configuration sent to the second network node is included in a container, and the second network node then sends the firs configuration to the user equipment.

In the above Method 2, optionally, when it is determined that the first configuration exists, the first configuration is sent to the second network node, and the second network node sends the first configuration to the user equipment; or, when the first configuration is changed, the first configuration is sent to the second network node, and the second network node sends the first configuration to the user equipment.

Step 404, receiving a first indication reported by the user equipment of whether the measurement gap is needed.

In the embodiment of the present disclosure, optionally, the first indication is used to indicate one or more of:
- whether each configured BWP needs the measurement gap; that is, the user equipment determines whether the measurement gap is needed according to the configured BWP;
- whether each activated BWP needs the measurement gap; that is, the user equipment determines whether the measurement gap is needed according to the activated BWP;
- whether each deployed bandwidth needs the measurement gap; that is, the user equipment determines whether the measurement gap is needed according to the deployed bandwidth;
- whether each operating bandwidth needs the measurement gap; that is, the user equipment determines whether the measurement gap is needed according to the operating bandwidth;
- whether each measurement object needs the measurement gap; and
- whether the user equipment needs the measurement gap.

In the embodiment of the present disclosure, optionally, the first indication is used to indicate one or more of:
- an indication corresponding to per-UE measurement gap;
- an indication corresponding to per-CC measurement gap;
- an indication corresponding to per-CG measurement gap;
- an indication corresponding to per-BWP measurement gap;
- an indication corresponding to per-band measurement gap;
- an indication corresponding to per-band combination measurement gap;
- an indication corresponding to per-channel measurement gap;
- an indication corresponding to per-channel combination measurement gap;
- an indication corresponding to per-measurement object measurement gap; and
- an indication corresponding to per-frequency measurement gap.

In the embodiment of the present disclosure, optionally, the first indication may achieve the indication by the following methods:

Method 1: the first indication includes: a first indication bit indicating whether the measurement gap is needed; for example, 1 bit is used to indicate whether the measurement gap is needed;

Method 2: the first indication includes: a second indication bit (e.g., 1 bit) and a third indication bit (e.g., 1 bit), wherein the second indication bit indicates whether the measurement gap is needed; the third indication bit indicates one or more of: whether it is necessary to confirm with the user equipment whether the measurement gap is needed; whether it is necessary to confirm with the first network node whether the measurement gap is needed; whether it is necessary to confirm with the second network node whether the measurement gap is needed; and whether it is necessary to request the first configuration.

As for the above Method 2, optionally, after receiving the request, the user equipment or the first network node or the second network node sends, to the second network node or the first network node, the first indication of whether the measurement gap is needed, or the above first configuration.

In other words, in step 404, in the case that the first configuration includes at least one of: the configured BWP, the activated BWP, the deployed bandwidth and the operating bandwidth, when the user equipment reports to the first network node the first indication of whether the measurement gap is needed according to the above first configuration, the user equipment will report at least one of: whether the measurement gap is needed, that is determined according to the configured BWP; whether the measurement gap is needed, that is determined according to the activated BWP; whether the measurement gap is needed, that is determined according to the deployed bandwidth; and whether the measurement gap is needed, that is determined according to the current operating bandwidth of the user equipment.

Step 405, configuring the measurement gap for the user equipment according to a predetermined parameter, wherein the predetermined parameter includes one or more of: the capability indication of the user equipment, the first indication, and the first configuration.

In the embodiment of the present disclosure, optionally, the capability indication of the user equipment includes a frequency, a bandwidth, a BWP position and a BWP bandwidth supported by the UE.

In the embodiment of the present disclosure, optionally, the measurement gap may include one or more of: per-UE measurement gap; per-CC measurement gap; per-CG measurement gap; per-BWP measurement gap; per-band measurement gap; per-band combination measurement gap; per-channel measurement gap; per-channel combination measurement gap; per-measurement object measurement gap; and per-frequency measurement gap; obviously, it is not limited thereto.

In the embodiment of the present disclosure, optionally, the measurement gap may include one or more of:
- measurement gap information corresponding to all or part of configured BWPs;
- measurement gap information corresponding to all or part of activated BWPs;
- measurement gap information corresponding to a deployed bandwidth;
- measurement gap information corresponding to a current operating bandwidth of the user equipment; and
- measurement gap information corresponding to a measurement configuration of the user equipment.

In the embodiment of the present disclosure, optionally, the measurement gap may include one or more of: a time start position, a duration, a period, an aperiodic indication, an one-off indication, and an offset.

In this way, the first network node can coordinately configure the measurement gap for the user equipment according to the capability indication of the user equipment reported by the user equipment and the first configuration, and thus the first network node can dynamically configure the measurement gap so that the measurement gap configured by the first network node dynamically can meet the requirement for a flexible configuration of measurement gap.

Figure 5:
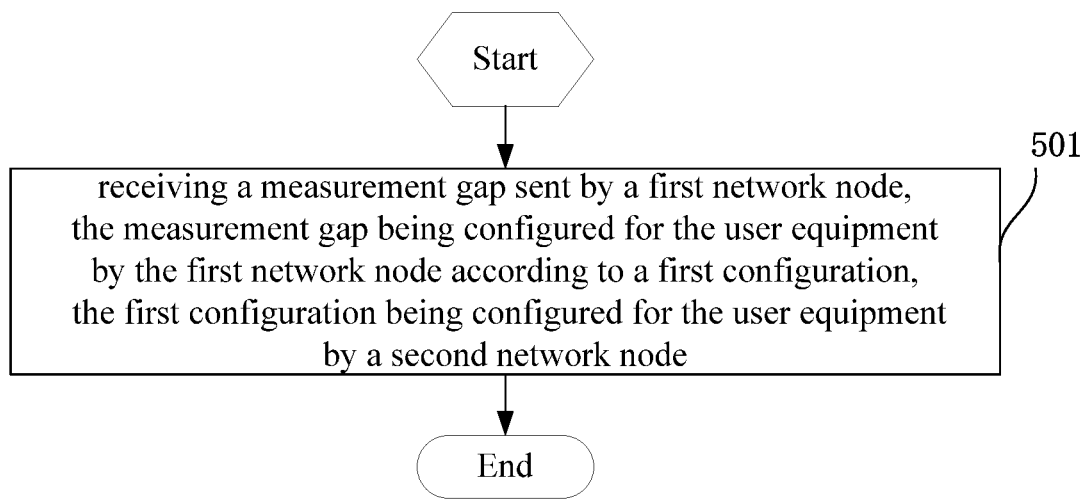
FIG. 5 is a fourth flowchart of a measurement gap configuration method according to an embodiment of the present disclosure.

Referring to FIG. 5, it shows a flowchart of a measurement gap configuration method, which is applied to a user equipment, including step 501.

Step 501, receiving a measurement gap sent by a first network node, the measurement gap being configured for the user equipment by the first network node according to a first configuration, the first configuration being configured for the user equipment by a second network node.

In the embodiment of the present disclosure, optionally, the first configuration may be configured for the UE by the second network node according to a capability indication reported by the UE. The capability indication includes one or more of: a frequency, a bandwidth, a BWP position and a BWP bandwidth supported by the UE; obviously, it is not limited thereto.

In the embodiment of the present disclosure, the first and second network nodes may be network nodes in the dual connectivity architecture. The dual connectivity architecture can be applied to 5G systems or other systems with similar requirement for the configuration of measurement gap. Obviously, it can be understood that the measurement gap configuration method of the embodiment of the present disclosure can also be applied to the Carrier Aggregation (CA) architecture or other architecture similar to DC or CA.

In the embodiment of the present disclosure, the first network node may be a master node (MN), and the second network node is a secondary node (SN); or, the first network may be the SN, and the second network node is the MN.

For example, the first network node is a master base station in the NR-LTE architecture or the NR-LTE DC architecture or the NR-NR DC architecture, and the second network node is a secondary base station in the NR-LTE architecture or the NR-LTE DC architecture or the NR-NR DC architecture; or, the first network node is a secondary base station in the NR-LTE architecture or the NR-LTE DC architecture or the NR-NR DC architecture, and the second network node is a master base station in the NR-LTE architecture or the NR-LTE DC architecture or the NR-NR DC architecture.

In the 5G NR architecture or the EN-DC architecture, the SN may have more capabilities, including the capability to configure the measurement gap. After the SN configures the measurement gap, it can coordinate with the MN to configure the measurement gap of the UE to achieve a dynamic configuration of the measurement gap by the MN, so that the measurement gap configured dynamically by the MN can adapt to the flexible configuration of measurement gap in the 5G NR system or the EN-DC system.

In the embodiment of the present disclosure, the first configuration may include one or more of: a measurement configuration, a configured bandwidth part (BWP), an activated BWP, a synchronization signal block (SSB) pattern, a deployed frequency, a deployed bandwidth, an operating frequency, and an operating bandwidth; obviously, it is not limited thereto. The measurement configuration refers to the configuration of measurement gap. Optionally, the measurement gap may include: a measurement object and/or a measurement parameter; obviously, it is not limited thereto.

It should be noted that the above user equipment may be a mobile phone, a tablet, a notebook, an Ultra-Mobile Personal Computer (UMPC), a netbook, or a Personal Digital Assistant (PDA), or the like.

Figure 6:
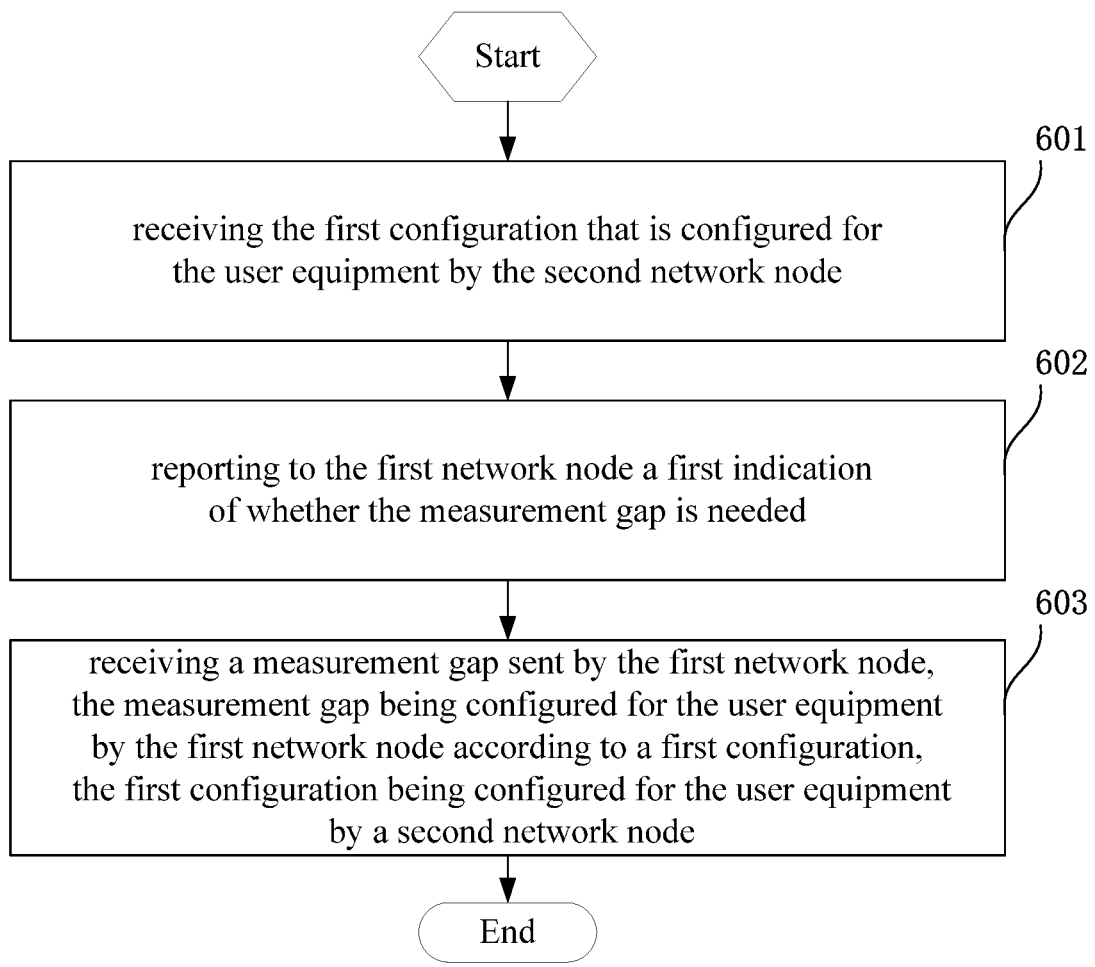
FIG. 6 is a fifth flowchart of a measurement gap configuration method according to an embodiment of the present disclosure.

Referring to FIG. 6, it shows a flowchart of a measurement gap configuration method, which is applied to a user equipment, including steps 601 to 603.

Step 601, receiving the first configuration that is configured for the user equipment by the second network node.

In the embodiment of the present disclosure, optionally, the first configuration may be configured for the UE by the second network node according to a capability indication reported by the UE. The capability indication includes one or more of: a frequency, a bandwidth, a BWP position and a BWP bandwidth supported by the UE; obviously, it is not limited thereto.

In the embodiment of the present disclosure, the first and second network nodes may be network nodes in the dual connectivity architecture. The dual connectivity architecture can be applied to 5G systems or other systems with similar requirement for the configuration of measurement gap. Obviously, it can be understood that the measurement gap configuration method of the embodiment of the present disclosure can also be applied to other similar architectures.

For example, the first network node is a master base station in the NR-LTE architecture or the NR-LTE DC architecture or the NR-NR DC architecture, and the second network node is a secondary base station in the NR-LTE architecture or the NR-LTE DC architecture or the NR-NR DC architecture; or, the first network node is a secondary base station in the NR-LTE architecture or the NR-LTE DC architecture or the NR-NR DC architecture, and the second network node is a master base station in the NR-LTE architecture or the NR-LTE DC architecture or the NR-NR DC architecture.

In the embodiment of the present disclosure, the first network node may be a master node (MN), and the second network node is a secondary node (SN); or, the first network may be the SN, and the second network node is the MN.

In the 5G NR architecture or the EN-DC architecture, the SN may have more capabilities, including the capability to configure the measurement gap. After the SN configures the measurement gap, it can coordinate with the MN to configure the measurement gap of the UE to achieve a dynamic configuration of the measurement gap by the MN, so that the measurement gap configured dynamically by the MN can adapt to the flexible configuration of measurement gap in the 5G NR system or the EN-DC system.

In the embodiment of the present disclosure, the first configuration may include one or more of: a measurement configuration, a configured bandwidth part (BWP), an activated BWP, a synchronization signal block (SSB) pattern, a deployed frequency, a deployed bandwidth, an operating frequency, and an operating bandwidth; obviously, it is not limited thereto. The measurement configuration refers to the configuration of measurement gap. Optionally, the measurement gap may include: a measurement object and/or a measurement parameter; obviously, it is not limited thereto.

It should be noted that the above user equipment may be a mobile phone, a tablet, a notebook, an Ultra-Mobile Personal Computer (UMPC), a netbook, or a Personal Digital Assistant (PDA), or the like.

It should be noted that the above step 601 is an optional step.

Step 602, reporting to the first network node a first indication of whether the measurement gap is needed.

For example, reporting, according to the first configuration, to the first network node a first indication of whether the measurement gap is needed.

In the embodiment of the present disclosure, optionally, the first indication is used to indicate one or more of:
 whether each configured BWP needs the measurement gap;
 whether each activated BWP needs the measurement gap;
 whether each deployed bandwidth needs the measurement gap;
 whether each operating bandwidth needs the measurement gap;
 whether each measurement object needs the measurement gap; and
 whether the user equipment needs the measurement gap.

In the embodiment of the present disclosure, optionally, the first indication includes one or more of: an indication corresponding to per-UE measurement gap; an indication corresponding to per-CC measurement gap; an indication corresponding to per-CG measurement gap; an indication corresponding to per-BWP measurement gap; an indication corresponding to per-band measurement gap; an indication corresponding to per-band combination measurement gap; an indication corresponding to per-channel measurement gap; an indication corresponding to per-channel combination measurement gap; an indication corresponding to per-measurement object measurement gap; and an indication corresponding to per-frequency measurement gap.

In the embodiment of the present disclosure, optionally, the first indication includes: a first indication bit indicating whether the measurement gap is needed; or the first indication includes: a second indication bit and a third indication bit, wherein the second indication bit indicates whether the measurement gap is needed; the third indication bit indicates one or more of: whether it is necessary to confirm with the user equipment whether the measurement gap is needed; whether it is necessary to confirm with the first network node whether the measurement gap is needed; whether it is necessary to confirm with the second network node whether the measurement gap is needed; and whether it is necessary to request the first configuration.

Step 603, receiving a measurement gap sent by the first network node, the measurement gap being configured for the user equipment by the first network node according to a first configuration, the first configuration being configured for the user equipment by a second network node.

An embodiment of the present disclosure further provides a first network node. Since the principle of solving the problem by the first network node is similar to the measurement gap configuration method in the embodiment of the present disclosure, the implementation of the first network node can refer to the implementation of the method, and the duplicated details will not be repeated.

Figure 7:
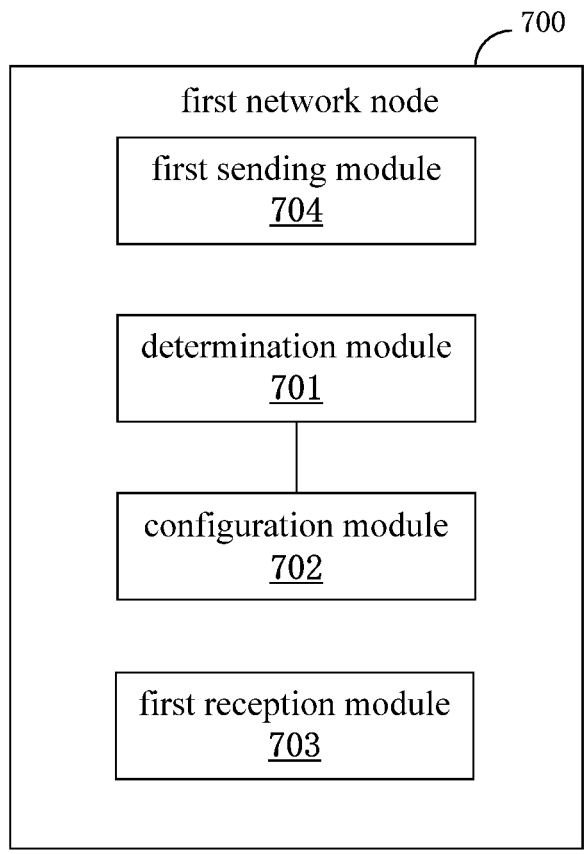
FIG. 7 is a first structural diagram of a first network node according to an embodiment of the present disclosure.

Referring to FIG. 7, it shows a structure of a first network node. The first network node 700 includes:
  a determination module 701 configured to determine a first configuration that is configured for a user equipment by a second network node; and
  a configuration module 702 configured to configure a measurement gap for the user equipment according to the first configuration.

In the embodiment of the present disclosure, optionally, the configuration module 702 is further configured to: configure the measurement gap for the user equipment directly according to the first configuration, or configure the measurement gap for the user equipment according to the first configuration and a capability indication reported by the user equipment.

In the embodiment of the present disclosure, optionally, the first configuration includes one or more of: a measurement configuration, a configured bandwidth part (BWP), an activated BWP, a synchronization signal block (SSB) pattern, a deployed frequency, a deployed bandwidth, an operating frequency, and an operating bandwidth.

In the embodiment of the present disclosure, optionally, referring to FIG. 7 again, the first network node 700 further includes: a first reception module 703 configured to receive the first configuration that is configured for the user equipment by the second network node.

It should be noted that, in the embodiment of the present disclosure, the first receiving module 703 and the determining module 701 may be two separate functional modules, or may be integrated into one functional module.

In the embodiment of the present disclosure, optionally, the first reception module 703 is further configured to: receive, from the second network node, the first configuration that is configured for the user equipment by the second network node; or receive, from the second network node, the first configuration that is configured for the user equipment by the second network node, wherein the first configuration is reported to the second network node by the user equipment; or receive the first configuration reported by the user equipment that is configured for the user equipment by the second network node; or receive the first configuration reported by the user equipment that is configured for the user equipment by the second network node, wherein the first configuration is sent to the user equipment by the first network node or the second network node.

In the embodiment of the present disclosure, optionally, the first reception module 703 is further configured to: receive, from the second network node, the first configuration that is configured for the user equipment by the second network node, when the second network node has the first configuration that is configured for the user equipment by the second network node; or receive, from the second network node, the first configuration that is configured for the user equipment by the second network node, when the first configuration that is configured for the user equipment by the second network node is changed.

In the embodiment of the present disclosure, optionally, the first reception module 703 is further configured to: receive, from an interface between base stations of the second network node or an operation management and maintenance (OAM), the first configuration that is configured for the user equipment by the second network node.

In the embodiment of the present disclosure, optionally, the first network node 700 further includes: a first sending module 704 configured to send a request message to the second network node for requesting the first configuration that is configured for the user equipment by the second network node.

In the embodiment of the present disclosure, optionally, the first reception module 703 is further configured to: receive a first indication reported by the user equipment of whether the measurement gap is needed.

In the embodiment of the present disclosure, optionally, the configuration module 702 is further configured to: configure the measurement gap for the user equipment according to a predetermined parameter, wherein the predetermined parameter includes one or more of: the capability indication of the user equipment, the first indication, and the first configuration.

In the embodiment of the present disclosure, optionally, the first sending module is further configured to: send the first configuration to the user equipment.

In the embodiment of the present disclosure, optionally, the first sending module 704 is further configured to: send the first configuration to the user equipment directly; or send the first configuration to the user equipment via the second network node.

In the embodiment of the present disclosure, optionally, the first sending module 704 is further configured to: send the first configuration to the user equipment directly when it is determined that the first configuration exists; or send the changed first configuration to the user equipment directly when the first configuration is changed; or
  the first sending module 704 is further configured to: send the first configuration to the user equipment via the second network node when it is determined that the first configuration exists; or send the first configuration to the user equipment via the second network node when the first configuration is changed.

In the embodiment of the present disclosure, optionally, the first indication is used to indicate one or more of:
  whether each configured BWP needs the measurement gap;

whether each activated BWP needs the measurement gap;
whether each deployed bandwidth needs the measurement gap;
whether each operating bandwidth needs the measurement gap;
whether each measurement object needs the measurement gap; and
whether the user equipment needs the measurement gap.

In the embodiment of the present disclosure, optionally, the first indication includes one or more of:
an indication corresponding to per-UE measurement gap;
an indication corresponding to per-CC measurement gap;
an indication corresponding to per-CG measurement gap;
an indication corresponding to per-BWP measurement gap;
an indication corresponding to per-band measurement gap;
an indication corresponding to per-band combination measurement gap;
an indication corresponding to per-channel measurement gap;
an indication corresponding to per-channel combination measurement gap;
an indication corresponding to per-measurement object measurement gap; and
an indication corresponding to per-frequency measurement gap.

In the embodiment of the present disclosure, optionally, the first indication includes: a first indication bit indicating whether the measurement gap is needed; or
the first indication includes: a second indication bit and a third indication bit, wherein the second indication bit indicates whether the measurement gap is needed;
the third indication bit indicates one or more of:
whether it is necessary to confirm with the user equipment whether the measurement gap is needed;
whether it is necessary to confirm with the first network node whether the measurement gap is needed;
whether it is necessary to confirm with the second network node whether the measurement gap is needed; and
whether it is necessary to request the first configuration.

In the embodiment of the present disclosure, optionally, the measurement gap includes one or more of:
per-UE measurement gap;
per-CC measurement gap;
per-CG measurement gap;
per-BWP measurement gap;
per-band measurement gap;
per-band combination measurement gap;
per-channel measurement gap;
per-channel combination measurement gap;
per-measurement object measurement gap; and
per-frequency measurement gap.

In the embodiment of the present disclosure, optionally, the measurement gap includes one or more of:
measurement gap information corresponding to all or part of configured BWPs;
measurement gap information corresponding to all or part of activated BWPs;
measurement gap information corresponding to a deployed bandwidth;
measurement gap information corresponding to a current operating bandwidth of the user equipment; and
measurement gap information corresponding to a measurement configuration of the user equipment.

In the embodiment of the present disclosure, optionally, the measurement gap includes one or more of: a time start position, a duration, a period, an aperiodic indication, an one-off indication, and an offset.

In the embodiment of the present disclosure, optionally, the first network node is a master node (MN), and the second network node is a secondary node (SN); or, the first network is the SN, and the second network node is the MN.

The first network node provided by the embodiment of the present disclosure can implement the above method embodiment, and the implementation principle and technical effects are similar, and will not be repeated in the present embodiment.

An embodiment of the present disclosure further provides a user equipment. Since the principle of solving the problem by the user equipment is similar to the measurement gap configuration method in the embodiment of the present disclosure, the implementation of the user equipment can refer to the implementation of the method, and the duplicated details will not be repeated again.

Figure 8:
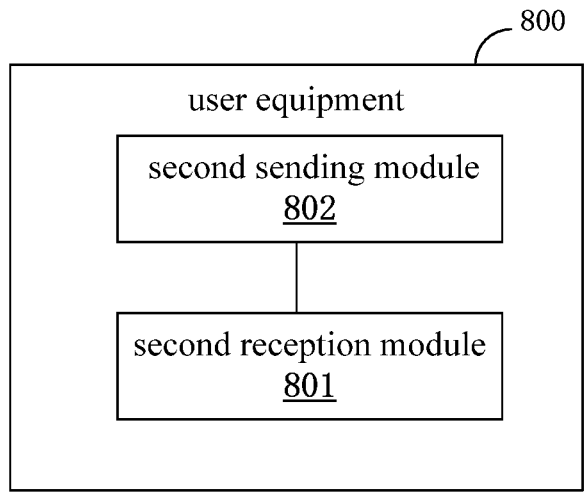
FIG. 8 is a first structural diagram of a user equipment according to an embodiment of the present disclosure.

Referring to FIG. 8, it shows a structure of a user equipment. The user equipment 800 includes:
a second reception module 801 configured to receive a measurement gap sent by a first network node, the measurement gap being configured for the user equipment by the first network node according to a first configuration, the first configuration being configured for the user equipment by a second network node.

In the embodiment of the present disclosure, optionally, the first configuration includes one or more of: a measurement configuration, a configured bandwidth part (BWP), an activated BWP, a synchronization signal block (SSB) pattern, a deployed frequency, a deployed bandwidth, an operating frequency, and an operating bandwidth.

In the embodiment of the present disclosure, optionally, the user equipment 800 further includes:
a second sending module 802 configured to report to the first network node a first indication of whether the measurement gap is needed.

In the embodiment of the present disclosure, optionally, the second sending module 802 is further configured to: report to the first network node the first indication of whether the measurement gap is needed according to the first configuration.

In the embodiment of the present disclosure, optionally, the second reception module 801 is further configured to: receive the first configuration that is configured for the user equipment by the second network node.

In the embodiment of the present disclosure, optionally, the first indication is used to indicate one or more of:
whether each configured BWP needs the measurement gap;
whether each activated BWP needs the measurement gap;
whether each deployed bandwidth needs the measurement gap;
whether each operating bandwidth needs the measurement gap;
whether each measurement object needs the measurement gap; and
whether the user equipment needs the measurement gap.

In the embodiment of the present disclosure, optionally, the first indication includes one or more of:
an indication corresponding to per-UE measurement gap;
an indication corresponding to per-CC measurement gap;
an indication corresponding to per-CG measurement gap;
an indication corresponding to per-BWP measurement gap;

an indication corresponding to per-band measurement gap;

an indication corresponding to per-band combination measurement gap;

an indication corresponding to per-channel measurement gap;

an indication corresponding to per-channel combination measurement gap;

an indication corresponding to per-measurement object measurement gap; and an indication corresponding to per-frequency measurement gap.

In the embodiment of the present disclosure, optionally, the first indication includes: a first indication bit indicating whether the measurement gap is needed; or the first indication includes: a second indication bit and a third indication bit, wherein the second indication bit indicates whether the measurement gap is needed;

the third indication bit indicates one or more of:

whether it is necessary to confirm with the user equipment whether the measurement gap is needed;

whether it is necessary to confirm with the first network node whether the measurement gap is needed;

whether it is necessary to confirm with the second network node whether the measurement gap is needed; and whether it is necessary to request the first configuration.

The user equipment provided by the embodiment of the present disclosure can implement the above method embodiment, and the implementation principle and technical effects are similar, and will not be repeated in the present embodiment.

Figure 9:
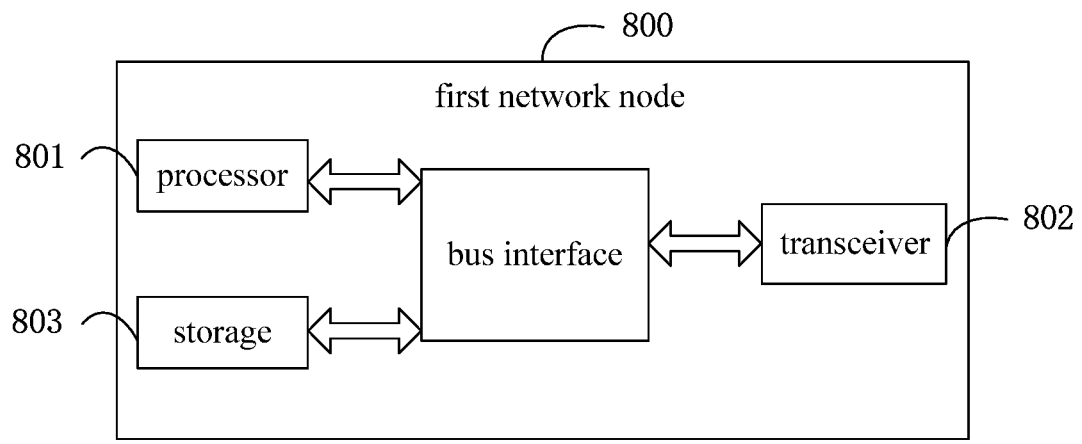
FIG. 9 is a second structural diagram of a first network node according to an embodiment of the present disclosure.

Referring to FIG. 9, it is a structural diagram of a first network node to which the embodiment of the present disclosure is applied. As shown in FIG. 9, the first network node 900 includes a processor 901, a transceiver 902, a storage 903 and a bus interface, wherein:

in the embodiment of the present disclosure, the first network node 900 further includes: a computer program stored on the storage 903 and capable of running on the processor 901, when executed by the processor 901, the computer program implementing the steps as follows: determining a first configuration that is configured for a user equipment by a second network node; and configuring a measurement gap for the user equipment according to the first configuration.

In FIG. 9, the bus architecture may include any number of interconnected buses and bridges which link together various circuits such as one or more processors represented by the processor 901 and the storage represented by the storage 903. The bus architecture can also link various other circuits such as peripherals, voltage regulators, and power management circuits, which are well known in the art, so they are not described further herein. The bus interface provides an interface. The transceiver 902 may be multiple elements, including a transmitter and a receiver, providing a unit for communicating with various other devices over a transmission medium.

The processor 901 is responsible for managing the bus architecture and general processing, and the storage 903 may store data used by the processor 901 when performing operations.

Optionally, when executed by the processor 903, the computer program may further implement the following step: configuring the measurement gap for the user equipment directly according to the first configuration, or configuring the measurement gap for the user equipment according to the first configuration and the capability indication reported by the user equipment.

Optionally, when executed by the processor 903, the computer program may further implement the following step: receiving the first configuration that is configured for the user equipment by the second network node.

Optionally, when executed by the processor 903, the computer program may further implement the following step: receiving the first configuration sent by the second network node that is configured for the user equipment by the second network node, wherein the first configuration is reported to the second network node by the user equipment.

Optionally, when executed by the processor 903, the computer program may further implement the following step: receiving the first configuration that is configured for the user equipment by the second network node and that is sent by the second network node via an interface between base stations or an operation management and maintenance (OAM) configuration.

Optionally, when executed by the processor 903, the computer program may further implement the following step: receiving the first configuration reported by the user equipment that is configured for the user equipment by the second network node; or receiving the first configuration reported by the user equipment that is configured for the user equipment by the second network node, wherein the first configuration is sent to the user equipment by the first network node or the second network node.

Optionally, when executed by the processor 903, the computer program may further implement the following step: receiving the first configuration sent by the second network node when the first configuration that is configured for the user equipment by the second network node exists; or receiving the first configuration sent by the second network node when the first configuration that is configured for the user equipment by the second network node is changed.

Optionally, when executed by the processor 903, the computer program may further implement the following step: sending a request message to the second network node for requesting the first configuration that is configured for the user equipment by the second network node.

Optionally, when executed by the processor 903, the computer program may further implement the following step: receiving a first indication reported by the user equipment of whether the measurement gap is needed.

Optionally, when executed by the processor 903, the computer program may further implement the following step: sending the first configuration to the user equipment directly; or sending the first configuration to the user equipment via the second network node.

Optionally, when executed by the processor 903, the computer program may further implement the following step: configuring the measurement gap for the user equipment according to a predetermined parameter, wherein the predetermined parameter includes one or more of: the capability indication of the user equipment, the first indication, and the first configuration.

Optionally, when executed by the processor 903, the computer program may further implement the following step: sending the first configuration to the user equipment directly; or sending the first configuration to the user equipment via the second network node.

Optionally, when executed by the processor 903, the computer program may further implement the following step: sending the first configuration to the user equipment directly when it is determined that the first configuration exists; or sending the changed first configuration to the user equipment directly when the first configuration is changed; or sending the first configuration to the user equipment via the second network node when it is determined that the first configuration exists; or sending the first configuration to the user equipment via the second network node when the first configuration is changed.

Figure 10:
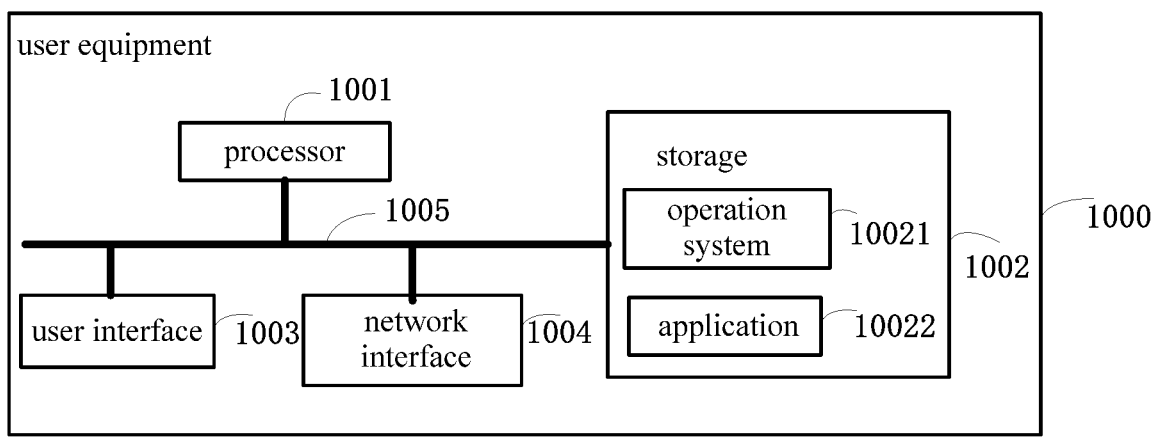
FIG. 10 is a second structural diagram of a user equipment according to an embodiment of the present disclosure.

As shown in FIG. 10, the user equipment 1000 in FIG. 10 includes: at least one processor 1001, a storage 1002, at least one network interface 1004, and a user interface 1003. Various components in the terminal equipment 1000 are coupled with each other through a bus system 1005. It will be appreciated that the bus system 1005 is configured to implement connection and communication between these components. In addition to a data bus, the bus system 1005 includes a power bus, a control bus, and a status signal bus. However, for the sake of clarity, various buses are marked as the bus system 1005 in FIG. 10.

Wherein, the user interface 1003 may include a display, a keyboard, a pointing device (e.g., a mouse, a trackball), a touch pad, or a touch screen, etc.

It will be appreciated that, the storage 1002 in the embodiment of the present disclosure may be a volatile memory or a non-volatile memory, or may include both volatile and non-volatile memory. Among them, the non-volatile memory may be a read-only memory (ROM), a programmable ROM (PROM), an erasable PROM (EPROM), an electronically EPROM (EEPROM) or a flash memory. The volatile memory may be a Random Access Memory (RAM), which is used as an external cache. By way of example, but not limitation, many forms of RAMs are available, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), and a DirectRambus RAM (DRRAM). The storage 1002 of the systems and methods described in the embodiments of the present disclosure is intended to include, but is not limited to, these and any other suitable types of memory.

In some implementations, the storage 1002 saves the following elements, executable modules, or data structures, or a subset of them, or their extended set: an operating system 10021 and an application program 10022.

Wherein the operating system 10021 includes various system programs, such as a framework layer, a core library layer, a driver layer, etc., and is used to implement various basic services and to process hardware-based tasks. The application program 10022 includes various application programs, such as a media player, a browser, etc., and is used to implement various application services. A program for implementing the method of an embodiment of the present disclosure may be included in the application program 10022.

In the embodiment of the present disclosure, by calling a program or instruction stored in the storage 1002, specifically, the program or instruction stored in the application 10022 and executing the same, the following step is implemented: receiving a measurement gap sent by a first network node, the measurement gap being configured for the user equipment by the first network node according to a first configuration, and the first configuration being configured for the user equipment by a second network node.

Optionally, when executed by the processor 1001, the computer program may further implement the following step: reporting to the first network node a first indication of whether the measurement gap is needed.

Optionally, when executed by the processor 1001, the computer program may further implement the following step: reporting, according to the first configuration, to the first network node the first indication of whether the measurement gap is needed.

Optionally, when executed by the processor 1001, the computer program may further implement the following step: receiving the first configuration that is configured for the user equipment by the second network node.

The steps of the methods or algorithms disclosed in combination with the contents disclosed by the present disclosure may be implemented by hardware, or may be performed by executing software instructions by a processor. The software instructions may be composed of corresponding software modules, and the software modules may be stored in RAM, flash memory, ROM, EPROM, EEPROM, registers, hard disk, mobile hard disk, read-only optical disk, or any other form of storage medium known in the art. An exemplary storage medium is coupled to the processor such that the processor can read information from, and write information to, the storage medium. Of course, the storage medium may also be an integral part of the processor. The processor and the storage medium may reside in an ASIC. In addition, the ASIC can be located in a core network interface device. Of course, the processor and the storage medium can also exist as discrete components in the core network interface device.

Those skilled in the art will appreciate that, in one or more of the above examples, the functions described in this disclosure may be implemented in hardware, software, firmware, or any combination thereof. When implemented in software, these functions may be stored on a computer-readable medium or transmitted as one or more instructions or codes on a computer-readable medium. The computer-readable medium includes computer storage medium and communication medium, and the communication medium includes any medium that facilitates transfer of a computer program from one place to another. A storage medium may be any available medium that can be accessed by a general purpose or special purpose computer.

The specific implementations described above further describe the objectives, technical solutions, and beneficial effects of the present disclosure in detail. It will be appreciated that the foregoing descriptions are merely specific implementations of the disclosure, and are not intended to limit the protective scope of the present disclosure. Any modification, equivalent replacement, and improvement made on the basis of the technical solutions of this disclosure shall be included in the scope of protection of this disclosure.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program codes therein.

The present disclosure is described with reference to flowcharts and/or block diagrams of methods, devices (systems), and computer program products according to the embodiments of the present disclosure. It will be appreciated that each process and/or block in the flowcharts and/or block diagrams, and combinations of processes and blocks in the flowcharts and block diagrams may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device generate means for implementing the functions specified in one or more of the processes in the flowcharts and/or one or more of the blocks in the block diagrams.

These computer program instructions may also be stored in a computer-readable storage capable of directing a computer or other programmable data processing device to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing devices, so that a series of operation steps can be performed on the computer or other programmable devices to produce a computer-implemented process, so that the instructions executed on the computer or other programmable device provide the steps for implementing the functions specified in one or more of the processes in the flowcharts and/or one or more of the blocks in the block diagrams.

Obviously, those skilled in the art can make various modifications and variations to the embodiments of the present disclosure without departing from the spirit and scope of the present disclosure. Thus, these modifications and variations of the embodiments of the present disclosure fall within the scope of the claims of the present disclosure and their equivalent technologies, and the present disclosure also intends to include these modifications and variations.

What is claimed is:

1. A measurement gap configuration method applied to a first network node, comprising:
   determining a first configuration that is configured for a user equipment by a second network node; and
   configuring a measurement gap for the user equipment directly according to the first configuration;
   the first network node is a master node (MN), the second network node is a secondary node (SN); or the first network node is the SN, and the second network is the MN.

2. The configuration method according to claim 1, wherein the first configuration comprises one or more of: a measurement configuration, a configured bandwidth part (BWP), an activated BWP, a synchronization signal block (SSB) pattern, a deployed frequency, a deployed bandwidth, an operating frequency, and an operating bandwidth.

3. The configuration method according to claim 1, wherein the determining the first configuration that is configured for the user equipment by the second network node comprises:
   receiving the first configuration that is configured for the user equipment by the second network node.

4. The configuration method according to claim 3, wherein the receiving the first configuration that is configured for the user equipment by the second network node comprises:
   receiving, from the second network node, the first configuration that is configured for the user equipment by the second network node; or
   receiving, from the second network node, the first configuration that is configured for the user equipment by the second network node, wherein the first configuration is reported to the second network node by the user equipment; or
   receiving the first configuration reported by the user equipment that is configured for the user equipment by the second network node; or
   receiving the first configuration reported by the user equipment that is configured for the user equipment by the second network node, wherein the first configuration is sent to the user equipment by the first network node or the second network node.

5. The configuration method according to claim 4, wherein the receiving the first configuration sent by the second network node that is configured for the user equipment by the second network node comprises:
   receiving, from the second network node, the first configuration that is configured for the user equipment by the second network node, when the second network node has the first configuration that is configured for the user equipment by the second network node; or
   receiving, from the second network node, the first configuration that is configured for the user equipment by the second network node, when the first configuration that is configured for the user equipment by the second network node is changed.

6. The configuration method according to claim 1, further comprising:
   receiving a first indication reported by the user equipment of whether the measurement gap is needed.

7. The configuration method according to claim 6, wherein the configuring the measurement gap for the user equipment according to the capability indication of the user equipment reported by the user equipment and the first configuration comprises:
   configuring the measurement gap for the user equipment according to a predetermined parameter, wherein the predetermined parameter comprises one or more of: the capability indication of the user equipment, the first indication, and the first configuration.

8. The configuration method according to claim 6, before the receiving the first indication reported by the user equipment of whether the measurement gap is needed, further comprising:
   sending the first configuration to the user equipment.

9. The configuration method according to claim 8, wherein the sending the first configuration to the user equipment comprises:
   sending the first configuration to the user equipment directly; or
   sending the first configuration to the user equipment via the second network node.

10. The configuration method according to claim 9, wherein the sending the first configuration to the user equipment directly comprises:
    sending the first configuration to the user equipment directly when it is determined that the first configuration exists; or
    sending a changed first configuration to the user equipment directly when the first configuration is changed;
    the sending the first configuration to the user equipment via the second network node comprises:

sending the first configuration to the user equipment via the second network node when it is determined that the first configuration exists; or sending the first configuration to the user equipment via the second network node when the first configuration is changed.

11. The configuration method according to claim 6, wherein the first indication comprises one or more of:
whether each configured BWP needs the measurement gap;
whether each activated BWP needs the measurement gap;
whether each deployed bandwidth needs the measurement gap;
whether each operating bandwidth needs the measurement gap;
whether each measurement object needs the measurement gap; and
whether the user equipment needs the measurement gap; or, wherein the first indication comprises one or more of:
an indication corresponding to per-UE measurement gap;
an indication corresponding to per-CC measurement gap;
an indication corresponding to per-CG measurement gap;
an indication corresponding to per-BWP measurement gap;
an indication corresponding to per-band measurement gap;
an indication corresponding to per-band combination measurement gap;
an indication corresponding to per-channel measurement gap;
an indication corresponding to per-channel combination measurement gap;
an indication corresponding to per-measurement object measurement gap; and
an indication corresponding to per-frequency measurement gap; or, wherein the first indication comprises: a first indication bit indicating whether the measurement gap is needed; or
the first indication comprises: a second indication bit and a third indication bit, wherein the second indication bit indicates whether the measurement gap is needed;
the third indication bit indicates one or more of:
whether it is necessary to confirm with the user equipment whether the measurement gap is needed;
whether it is necessary to confirm with the first network node whether the measurement gap is needed;
whether it is necessary to confirm with the second network node whether the measurement gap is needed; and
whether it is necessary to request the first configuration.

12. The configuration method according to claim 1, wherein the measurement gap comprises one or more of:
per-UE measurement gap;
per-CC measurement gap;
per-CG measurement gap;
per-BWP measurement gap;
per-band measurement gap;
per-band combination measurement gap;
per-channel measurement gap;
per-channel combination measurement gap;
per-measurement object measurement gap; and
per-frequency measurement gap;
or, wherein the measurement gap comprises at least one or more of:
measurement gap information corresponding to all or part of configured BWPs;
measurement gap information corresponding to all or part of activated BWPs;
measurement gap information corresponding to a deployed bandwidth;
measurement gap information corresponding to a current operating bandwidth of the user equipment; and
measurement gap information corresponding to a measurement configuration of the user equipment;
or,
wherein the measurement gap information comprises one or more of: a time start position, a duration, a period, an aperiodic indication, an one-off indication, and an offset.

13. A measurement gap configuration method applied to a user equipment, comprising:
receiving a measurement gap sent by a first network node, wherein the measurement gap is configured for the user equipment by the first network node according to a first configuration, the first configuration is configured for the user equipment by a second network node;
wherein the first network node is a master node (MN), the second network node is a secondary node (SN); or the first network node is the SN, and the second network is the MN.

14. The configuration method according to claim 13, wherein the first configuration comprises one or more of: a measurement configuration, a configured bandwidth part (BWP), an activated BWP, a synchronization signal block (SSB) pattern, a deployed frequency, a deployed bandwidth, an operating frequency, and an operating bandwidth.

15. The configuration method according to claim 13, further comprises:
reporting to the first network node a first indication of whether the measurement gap is needed.

16. The configuration method according to claim 15, wherein the reporting to the first network node the first indication of whether the measurement gap is needed comprises:
reporting to the first network node the first indication of whether the measurement gap is needed according to the first configuration.

17. The configuration method according to claim 16, further comprising:
receiving the first configuration that is configured for the user equipment by the second network node.

18. The configuration method according to claim 15, wherein the first indication comprises one or more of:
whether each configured BWP needs the measurement gap;
whether each activated BWP needs the measurement gap;
whether each deployed bandwidth needs the measurement gap;
whether each operating bandwidth needs the measurement gap;
whether each measurement object needs the measurement gap; and
whether the user equipment needs the measurement gap; or,
wherein the first indication comprises one or more of:
an indication corresponding to per-UE measurement gap;
an indication corresponding to per-CC measurement gap;
an indication corresponding to per-CG measurement gap;
an indication corresponding to per-BWP measurement gap;

an indication corresponding to per-band measurement gap;

an indication corresponding to per-band combination measurement gap;

an indication corresponding to per-channel measurement gap;

an indication corresponding to per-channel combination measurement gap;

an indication corresponding to per-measurement object measurement gap; and an indication corresponding to per-frequency measurement gap;

or, wherein the first indication comprises: a first indication bit indicating whether the measurement gap is needed; or the first indication comprises: a second indication bit and a third indication bit, wherein the second indication bit indicates whether the measurement gap is needed; the third indication bit indicates one or more of:

whether it is necessary to confirm with the user equipment whether the measurement gap is needed;

whether it is necessary to confirm with the first network node whether the measurement gap is needed;

whether it is necessary to confirm with the second network node whether the measurement gap is needed; and whether it is necessary to request the first configuration.

19. A first network node, comprising a processor, a storage, and a program stored on the storage and capable of running on the processor, when executed by the processor, the program implementing the steps of the measurement gap configuration method according to claim 1.

20. A user equipment, comprising a processor, a storage, and a program stored on the storage and capable of running on the processor, when executed by the processor, the program implementing the steps of the measurement gap configuration method according to claim 13.

* * * * *